(12) United States Patent
Quicksall (10) Patent No.: US 6,449,289 B1
(45) Date of Patent: Sep. 10, 2002

(54) MULTI-PROCESSOR BUS PROTOCOL SYSTEM

(75) Inventor: Edward S. Quicksall, Longmont, CO (US)

(73) Assignee: Adaptec, Inc., Milpitas, CA (US)

( * ) Notice: Subject to any disclaimer, the term of this patent is extended or adjusted under 35 U.S.C. 154(b) by 0 days.

(21) Appl. No.: 09/169,444

(22) Filed: Oct. 9, 1998

(51) Int. Cl.[7] .............................................. G06F 13/16

(52) U.S. Cl. ........................................ 370/475; 710/110

(58) Field of Search ................................ 370/326, 389, 370/475, 474, 257, 438, 489; 709/211, 245, 208–210; 710/110

(56) References Cited

U.S. PATENT DOCUMENTS

| | | | | |
|---|---|---|---|---|
| 5,758,127 A | * | 5/1998 | MacAulay et al. | 395/500 |
| 5,768,277 A | * | 6/1998 | Ohno et al. | 370/457 |
| 5,859,847 A | * | 1/1999 | Dew et al. | 370/389 |
| 5,897,663 A | * | 4/1999 | Stancil | 711/200 |
| 6,260,127 B1 | * | 7/2000 | Olarig et al. | 711/167 |
| 6,163,849 A | * | 12/2000 | Nouri et al. | 713/324 |
| 6,209,022 B1 | * | 3/2001 | Sotek et al. | 709/209 |

OTHER PUBLICATIONS

"The I2C–bus and how to use it (including specifications)"; Phillips Semiconductors; p. 1–24; (Apr. 1995).

"I2C–bus controller—Product specification"; Phillips Semiconductors; p. 444–463 (Aug. 29, 1995).

\* cited by examiner

Primary Examiner—Melvin Marcelo
Assistant Examiner—Ron Abelson
(74) Attorney, Agent, or Firm—Patton Boggs LLP (57) ABSTRACT

A method of communicating between first and second controllers (including between processes within the controllers, or microprocessors) on an I$^2$C bus is provided. The I$^2$C bus is of the type which transmits data packets that start with a start condition and end with a stop condition, and that includes a destination address followed by a transmission type, a first data byte, a second data byte, and one or more additional data bytes. The method includes the steps of: designating a destination address with a unique bus address (i.e., devAddress) of the second controller; designating the first data byte with a unique bus address (i.e., ownAddress) of the first controller; and specifying the transmission type, wherein the first and second controllers initiate a master-slave relationship for read and write operations between controllers. The invention also provides an I$^2$C bus protocol system. The system includes an I$^2$C bus with means for communicating an I$^2$C packet across the bus. First and second controllers connect to the bus, with each controller having (a) means for specifying a devAddress as a slave address in the I$^2$C packet, (b) means for specifying ownAddress as a master address in a first data byte of the I$^2$C packet, and (c) means for specifying a tag within a subsequent data byte of the I$^2$C packet, wherein the first and second controllers initiate a master-slave relationship for read and write operations along a conduit between processes within the controllers.

15 Claims, 7 Drawing Sheets

| Start Condition | Slave Address | R/W | Acknowledge | Data | Acknowledge | Data | Not Acknowledge | Stop Condition |
|---|---|---|---|---|---|---|---|---|
| 16a | 16b | 16c | 16d | 16e | 16f | 16g | 16h | 16i |

| Start Condition | devAddress | R/W | Acknowledge | ownAddress | Acknowledge | Tag | Acknowledge | Data | Not Acknowledge | Stop Condition |
|---|---|---|---|---|---|---|---|---|---|---|
| 32 | 34 | 36 | 38 | 40 | 42 | 44 | 46 | 48 | 50 | 52 |

MULTI-PROCESSOR BUS PROTOCOL SYSTEM

FIELD OF THE INVENTION

The invention relates generally to a multi-processor bus protocol system utilizing I²C® bus architecture.

BACKGROUND OF THE INVENTION

Several bus architectures are known, including the I²C® multi-master bus interface and architecture developed by Philips Semiconductors. I²C bus protocol is currently device-specific. For example, National Semiconductor manufacturers the LM75 digital temperature sensor, an integrated circuit which provides temperature, delta sigma A/D conversion, and over temperature detection. The LM75 interfaces to the I²C® bus; and any microprocessor on the I²C bus must utilize a unique protocol defined by National Semiconductor in order to access data from the LM75.

Each I²C bus manufacturer thus creates a unique protocol for its I²C devices. System manufacturers—which incorporate several I²C bus devices within a microprocessor controlled system—must understand and utilize all relevant protocols for proper system operation, adding cost to the system.

There is therefore a need to provide an I²C bus interface protocol which reduces the complexity and requirements of integrating I²C bus devices into a system. One object of the invention is thus to provide an I²C bus protocol system which alleviates the afore-mentioned difficulties.

At least one other significant limitation exists with the I²C bus interface. Currently, any microprocessor on the I²C bus can be a "master" when communicating to an I²C bus device. However, with a strict master-slave relationship, processes within a microprocessor on the I²C bus cannot communicate with other processes in other microprocessors. There is therefore a need to provide a system which permits communication between multiple microprocessors, and between separate processes within these microprocessors, on the I²C bus; and another object of the invention is to provide such a system.

A further object of the invention is to provide inter-processor communication on an I²C bus without interfering with fixed protocols established by existing I²C devices connected to the bus.

Other objects of the invention will be apparent from the description which follows.

SUMMARY OF THE INVENTION

In one aspect, the invention provides a method for communicating between first and second controllers (including between processes within the controllers, or microprocessors) on an I²C bus. This bus is of the type which transmits data packets that start with a start condition and end with a stop condition, and that includes a destination address followed by a transmission type, a first data byte, a second data byte, and one or more additional data bytes. The method includes the steps of: designating a destination address with a unique bus address (i.e., devAddress) of the second controller; designating the first data byte with a unique bus address (i.e., ownAddress) of the first controller; and specifying the transmission type, wherein the first and second controllers initiate a master-slave relationship for read and write operations between controllers.

In another aspect, the method includes the step of specifying the transmission type, by designating a busControl type, that defines whether the first controller operates as a slave or master. This step can include the further aspect of specifying (a) a master request to initiate the master request as soon as possible or (b) a slave request to initiate the slave request when the first controller specifies matching conduit information.

In another aspect, the method of the invention can include the step of specifying the transmission type by designating an ioRequest that defines whether the transmission is Read, Write, Read/Write or Write/Read.

In still another aspect, the method of the invention includes the step of designating a read by initiating a master-transmit, slave-receive protocol followed by a master-receive, slave-transmit protocol. In a similar aspect, the method can also include the step of designating a read/write by initiating a master-transmit, slave-receive protocol followed by a master-receive, slave-transmit protocol, followed by a master-transmit, slave-receive protocol.

The methods of the invention can also, include the step of designating the second data byte with a tag specifying a process address within the second controller, the tag and address of the first controller defining a conduit between a process in the first controller and a process in the second controller. The step of receiving data from the second controller can include, in another aspect, transmitting a repeated start condition, slave address and transfer direction after formation of the conduit.

In another aspect, the method can include the step of designating one process in the second controller with a reserved tag identifier, to accept conduit communication without a match to an existing request.

Another aspect of the invention includes the step of specifying a tag of zero, wherein the tag and unique address are not transmitted between the first and second controllers.

In yet another aspect, the invention includes the step of designating the bus address of the second controller as a predetermined number to connect with any master without a match to an existing request. Another aspect includes transmitting data from the first controller to the second controller prior to generation of the stop condition.

In accord with one aspect of the invention, the master can talk to an I²C device with standard I²C protocol by specifying a tag of zero. In this case, the ownAddress and tag are not transmitted nor are they expected to be received.

The invention also provides an I²C bus protocol system. The system includes an I²C bus with means for communicating an I²C packet across the bus. First and second controllers connect to the bus, with each controller having (a) means for specifying a devAddress as a slave address in the I²C packet, (b) means for specifying ownAddress as a master address in a first data byte of the I²C packet, and (c) means for specifying a tag within a subsequent data byte of the I²C packet, wherein the first and second controllers initiate a master-slave relationship for read and write operations along a conduit between processes within the controllers.

In another aspect, one or more I²C devices connect to the bus, with each controller having means for communicating with the I²C devices without interfering with communication between the controllers.

These and other aspects and advantages of the invention are evident in the description which follows and in the accompanying drawings.

DETAILED DESCRIPTION OF THE INVENTION

Figure 1:
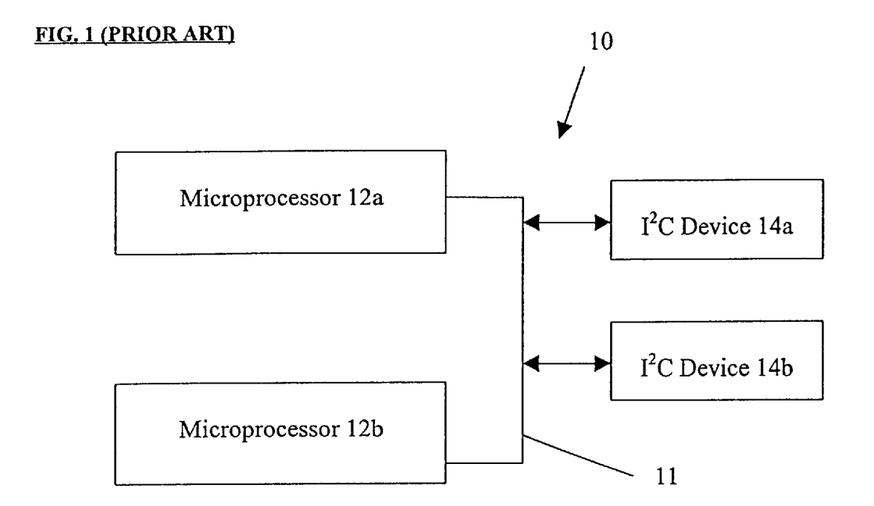
FIG. 1 illustrates a prior art system for communicating between microprocessors and devices on the I²C bus.

FIG. 1 shows a prior art system 10 illustrating communication protocol on the I²C bus 11. Two microprocessors 12a, 12b connect with the bus 11 and communicate to devices 14a, 14b through the communication protocol established by the particular device 14a, 14b manufacturer. For example, one popular device 14a can be the LM75 chip by National Semiconductor. In accord with current I²C protocol, the following characteristics and features of system 10 exist:

Bus 11 consists of two bi-directional lines, a serial data line ("SDA") and a serial clock line ("SCL")

Each device 14 is software addressable by a unique address

Only one microprocessor master 12 controls data transfer on the bus 11 at any moment in time; and arbitration occurs at simultaneous data transfer requests on bus 11

Bus 11 interfaces are established by low level electronics supplied by Philips Semiconductor Processes within microprocessor 12a cannot communicate with processes within microprocessor 12b, and vice versa No stop bit is transmitted, so data communication from any device 14 or microprocessor 12 locks up bus 11, prohibiting other simultaneous communication on bus 11

Figure 1A:
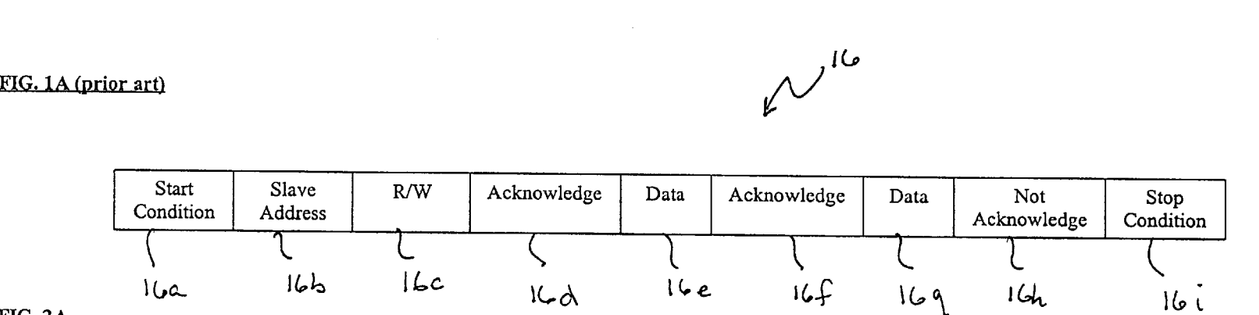
FIG. 1A shows a representative prior art communications format for the system of FIG. 1.

Any device 14 or microprocessor 12 can become master of the bus 11 once bus 11 is available Every byte on the SDA line is 8-bits long; data is transferred with most significant bit first FIG. 1A illustrates a representative communication data transfer format 16 between a master 12 and a slave 14 in the system 10 of FIG. 1. The first three blocks 16a–16c and blocks 16e, 16g and 16i refer to communications from the master 12 to the slave 14 (i.e., the master is the transmitter); and blocks 16i, 16f, 16h refer to communications from the slave 14 to the master 12 (i.e., the slave is the transmitter). FIG. 1A is illustrative in that each byte is usually followed by an acknowledgment bit such as indicated by block 16d, 16f. The obligatory acknowledgment is triggered by a master-generated clock pulse; and the transmitter (i.e., that device sending data on the bus 11) releases the SDA line (high) during the acknowledgment clock pulse. The start condition (block 16a) is implemented by a high-to-low transition on the SDA line (with the SCL line high). The stop condition (block 16i) is implemented by a low-to-high transition on the SDA line (with the SCL line high). The start and stop conditions (blocks 16a, 16i) are always generated by the master 12. Bus 11 is considered busy after the start condition and is free only after the stop condition (block 16i). Block 16c represents a READ or WRITE condition; and in format 16, the condition is WRITE. Block 16h represents a not acknowledgment condition generated by the slave 14 at the end of data transfer, followed by a stop condition 16i generated by the master 12. Other formats are described in the I²C specification from Philips Semiconductor.

Figure 2:
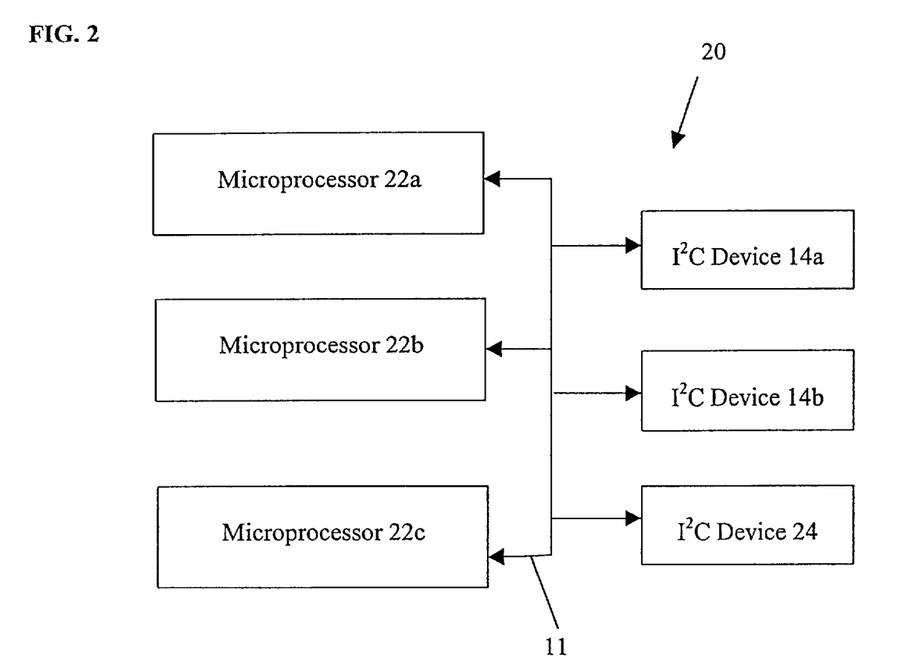
FIG. 2 illustrates a system constructed according to the invention for communication between multiple processors and devices on an I²C bus.

FIG. 2 illustrates a system 20 constructed according to the invention. In system 20, microprocessors 22a–22c connect to I²C bus 11 and also to I²C bus devices 14a, 14b and 24. As described in more detail below, system 20 supports communication between microprocessors 22; and communication between any microprocessor 22 and device 14, 24 occurs with a bus protocol defined below.

Figure 2A:
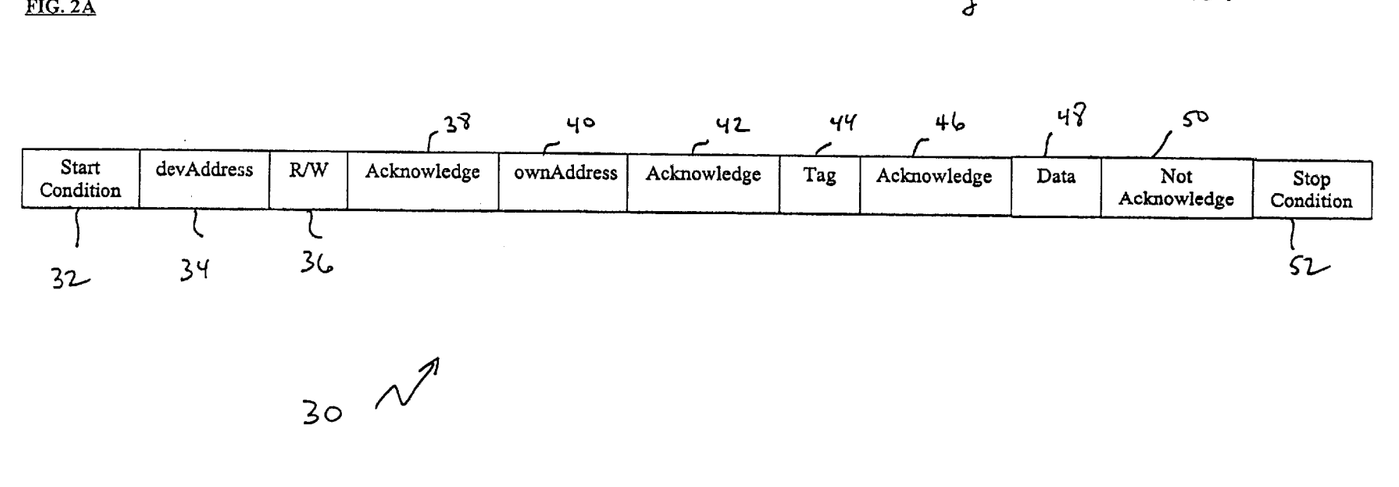
FIG. 2A illustrates a representative communications format for the system of FIG. 2.

FIG. 2A illustrates a representative data transfer format 30 utilized in system 20 of FIG. 2 for communication between a master 22 and a slave 14, 24, so long as these slaves understand the format 30. Masters 22 can also communicate with slaves 14, 24 in the specific formats defined by the I²C device manufacturer. The first three blocks 32, 34, 36 and blocks 40, 44, 48 and 52 refer to communications from the master 22 to the slave 14; and blocks 38, 42, 46 and 50 refer to slave-to-master communications. Data transfer format 30 is presented in a manner that is comparable with prior art format 16, FIG. 1A, for purposes of illustration. Start and stop conditions (blocks 32, 52), read/write condition (block 36), acknowledgments (blocks 38, 42, 46), and not acknowledgment (block 50) operate as above. However, in comparison to FIG. 1A, the slave address (block 16b, FIG. 1A), is replaced by devAddress (block 34) to specify the address of the receiving device; and the first data block (e.g., block 16e, FIG. 1A) is replaced with ownAddress (block 40), specifying the address of the transmitting device. By way of example, if microprocessor 22a desires to communicate with device 14a, the protocol of the particular device 14a is used (e.g., such as the protocol specified by the manufacturer to receive test temperature data from an I²C temperature sensing device). In another example, microprocessor 22a can also communicate with microprocessor 22c by specifying the devAddress as microprocessor 22c.

The tag designator illustrated by block 44 is described in more detail below and in connection with FIG. 3. Briefly, however, tag 44 represents a sub-address which provides lower level addressing within the receiving device. Accordingly, communication occurs not only between two devices, e.g., a microprocessor and an I²C device; but communications can also be addressed to a particular process within a microprocessor 22. In one preferred embodiment, if a driver is told that the TAG=0, then a special condition is implemented and the communication refers to raw I²C protocol (that is, the driver does not transmit tag and ownAddress, and neither is the tag and ownAddress expected in receive mode).

Data block 48 refers to data transferred to the device at ownAddress. Additional data blocks can be added to format 30 to provide for larger data transfers. Not acknowledgment (block 50) and a stop condition (block 52) follow completed data transfers.

Figure 3:
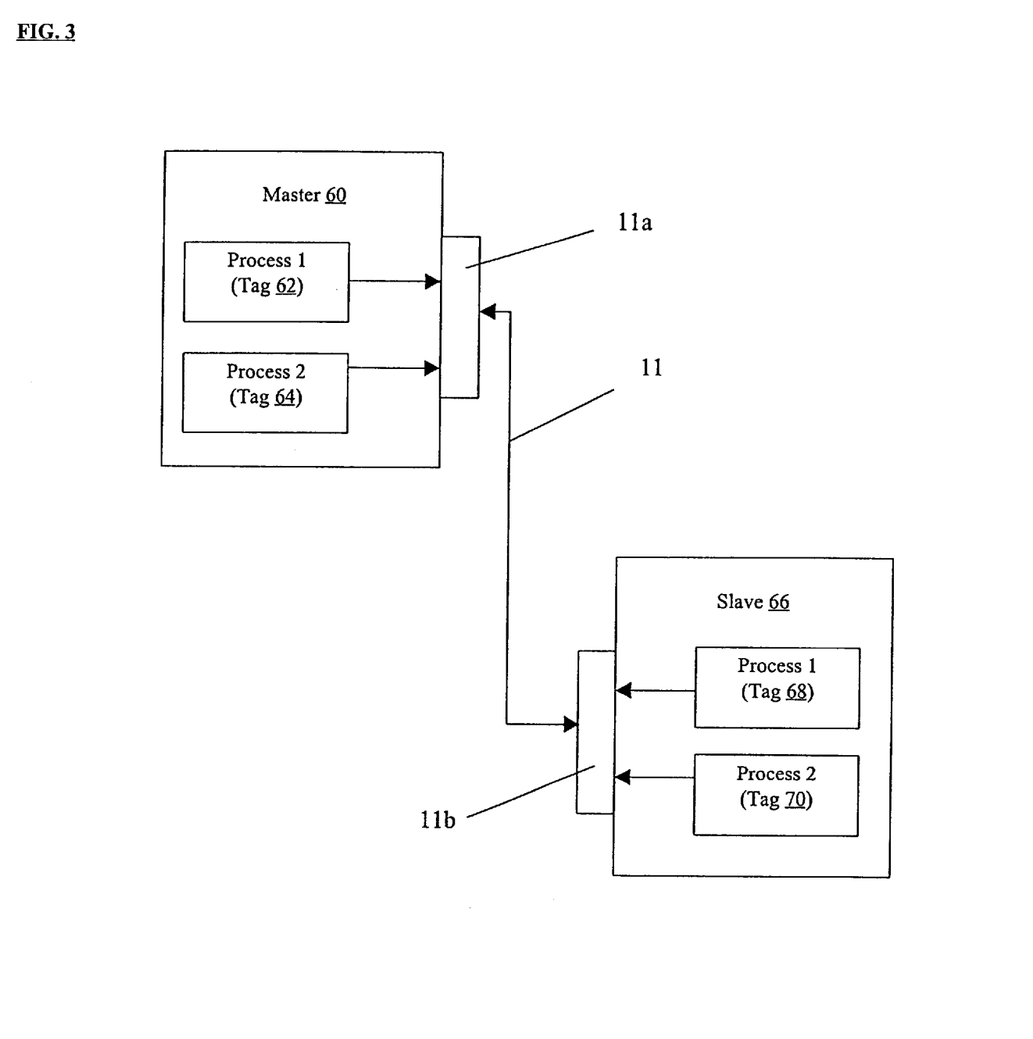
FIG. 3 schematically illustrates a master-slave bus protocol system which provides communication between lower level processes within the master and/or slave along an I²C bus, in accord with the invention.

FIG. 3 illustrates data communication between a master 60 and slave 66 connected to an I²C bus 11, in accord with the invention. The master 60 and/or slave 66 can be, for example, microprocessors with internal processes, illustratively labeled process 1 and process 2 (note that additional or fewer processes can exist within the microprocessors 60, 66). Communication between master 60 and a particular process within slave 66 is specified with a tag designator 44, FIG. 2A. Specifically, when master 60 requires communication with process 1 of slave 66, the tag designator 44, FIG. 2A, specifies the address (illustratively shown as Tag 68) of process 1. Alternatively, by setting the tag designator 44 to Tag 70, master 60 communicates with process 2 of slave 66.

Communications between processes generally occurs serially. For example, a communication between master 60, process 1, and slave 66, process 1 (i.e., designated by Tag 68) controls the bus during the communication. Once the communication is complete, for example, a communication between master 60, process 2, and slave 66, process 2 can commence. Note that process 1 of master 60 can also communicate with process 2 of master 66 using a Tag=70, for example.

Note that slave 66 can become the master after the bus 11 is free. In this case, "master" 66 can selectively communicate with processes 1 or 2 of "slave" 60 by specifying the tag designators 44 as Tag 62 or Tag 64, respectively.

In the preferred embodiment of the invention, tag designators are generally a number between 1 and 255, with 255 being the default or arbitrary condition. The master 60 does not specify a number 255, although any slave 66 can. As such, the 255 tag operates similar to a data filter: if a write condition is slated for a particular slave and process tag— and yet that slave does not have a corresponding tag designator—then the slave can accept the write condition as a tag 255.

The I²C bus 11 connects to each microprocessor 60, 66 through device drivers 11a, 11b (i.e., the electronic device drivers known in the art that comply with the Philips Semiconductor I²C specification). These drivers 11a, 11b encode and transmit conditions and data on the bus 11 with commanded formats such as format 30, FIG. 2A. The devices 11a, 11b further provide arbitration for use on the bus and priority sequencing, as described in more detail below.

The method described in connection with FIG. 3 utilizes "conduits" which provide "direct connect" between two processes (one on each end of the connection). One process running in a device may thus communicate directly with a process in another device over the I²C bus; and the conduit is the path over which they communicate. Many conduits may be in existence at a time. In the preferred embodiment of the invention, there can be 254 conduits between any two devices; and the maximum number of conduits is the product of the maximum number of devices using the protocol and 254.

As described above, the invention also provides source and destination addressing. The source address provides information to the device addressed in the destination address, —specifically the identity of the source of the message. The number of devices using the protocol is dependent on the number of I²C addresses already in use. I²C reserves addresses 0x00–0x07 and 0x7c–0x7F for 7-bit addressing, leaving 0x08–0x7B available for 116 I²C devices.

The invention also provides for "interlocking the conduit" until a response is generated. Prior to the invention, an interlock on the I²C bus occurs with master-transmit/slave-receive or master-receive/slave-transmit operations, locking out all communications to all devices on the bus until the bus is released. With the protocol of the invention, interlock only exists during a short period while software prepares a response, allowing several back-and-forth responses that may be interleaved with other communications using the same protocol.

The protocol of the invention uses two applications (referenced as processes above) to establish a communication. Both applications specify their own I²C address, the address of the opposite device, a tag, and the type of transmission. The controlling device (i.e., the master) sends the address of the opposite device (i.e., the slave) and the Input/output request type (read or write) as the first byte. This byte transfer is an I²C specification standard. The address and tag together form the conduit. In the case of the master, the devAddress and tag form the conduit. In the case of the slave, the ownAddress and tag form the conduit. It follows that the devAddress/tag and ownAddress/tag will match up the two requests.

Transmission types are separated into a busControl and an ioRequest. The busControl specifies whether the device is to operate as a master or a slave. The ioRequest specifies whether the transmission is a Read, Write, Read/Write or a Write/Read.

Packets

Messages are transmitted in a packet such as shown in FIG. 2A. The packet begins as a standard I²C data transfer, continues as specified herein, and finishes as a standard I²C data transfer. The packet of the preferred embodiment includes the following:

slave address: the first byte is the slave address (devAddress) in the high order 7 bits and a direction bit of 0 in the low-order bit.

1st byte: the first byte is the master address (ownAddress) in the low order 7 bits with the high order bit reserved (in standard I²C, this is the first data byte).

2nd byte: the second byte is the tag, which combined with the $1^{st}$ byte selects the conduit.

Repeated Start: the presence of this byte depends on the ioRequest

Data bytes: the application data from the master or slave.

Stop Condition: this ends the transmission.

The invention provides for two transmission scenarios: (1) the master transmits data to the slave device; or (2) the master receives data from the slave. Prior to the invention, if a slave wishes to transmit, it is up to the master to initiate a master-receive/slave-transmit operation because the master controls the clock and is responsible for initiating all transmissions. In the protocol of the invention, the tag and the master address are first transmitted so that the conduit is established. Because of this, our protocol uses the I²C master-transmit/slave-receive followed by a master-receive/slave-transmit for case (2), thereby transmitting the conduit information first and then receiving the result while the bus is interlocked. In case (1), after the last application data byte is transmitted, the Stop Condition is generated by the master and the bus is released. The Repeated Start is therefore not used. In case (2), after two bytes of conduit information are transmitted, a Repeated Start Condition, the slave Address and Transfer Direction bit (Read) is transmitted, which turns the line around. The response from the slave contains the application data. The master, upon completion of the data transfer, generates the Stop Condition; and there are no extra bytes (i.e. conduit information) appended to the response.

Requests

There are two types of requests provided for by the invention, immediate requests and queued requests. Immediate requests begin as soon as the bus becomes free (e.g., a master request is an immediate request). Queued requests begin when an immediate request makes a connection with the appropriate conduit (e.g., a slave request is a queued request).

Communications

To establish communication, the invention specifies the following:

busControl: specifies whether the application is a master or a slave ioRequest: specifies Read, Write, Read/Write or a Write/Read ownAddress: specifies the source address of the application device devAddress: specifies the destination address of the device to communicate with tag: specifies which conduit to use and a number to match the request with the opposite process After a communication is complete, the invention specifies the following:

rcvAddress: the address from which the communication originated rcvTag: the tag used by the opposite process More particularly, the busControl parameter specifies if the application is to be the master or the slave. With I²C, the master controls the clock and initiates the transmission. Being a master or slave does not determine who is transmitting or receiving. If busControl specifies a master request, an attempt is made to start the request immediately. If that is not possible, it is added to a master list and is started as soon as possible. If busControl specifies a slave request, the request is put onto the slave list and waits until a master sends a message that matches the request's conduit information using the criteria described below.

The ioRequest parameter specifies whether the communication is a Read, Write, Read/Write or Write/Read. A Read is performed by using a master-transmit/slave-receive followed by a master-receive/slave-transmit and a Read/Write uses a master-transmit/slave-receive followed by a master-receive/slave-transmit followed by a master-transmit/slave-receive.

The ownAddress parameter is the I²C address of the application device; and the devAddress parameter is the address of the device to which the communication is intended. The tag parameter is used to associate the request to a particular conduit. The rcvAddress parameter is set by the driver to the address of the master connected to a slave request. It is meaningful when the devAddress is 255 and the slave request was used as a "catch all" request. The rcvTag parameter is set by the driver to the tag of the master request connected to a slave request. It is meaningful when the slave's tag is 255.

Setting up a Communication

To setup a communication, one device uses the ioRequest to initiate a Read or Read/Write. The other device then use the ioRequest to immediately start a Write or Write/Read. The ownAddress is used to identify the device initiating the ioRequest and the devAddress is used to identify the opposite device.

The application also supplies a tag. As described above, the devAddress and tag together identify the conduit over which the communication takes place.

Address and Tag

The slave application may specify an exact devAddress, in which case the conduit exists to a specific master. Alternatively, it may supply a devAddress of 255. This "catch all" address is used to connect with any master which does not match an existing request. Similarly, the slave may supply a tag of 255. This "catch all" tag is used to connect with any tag which does not match an existing request. By using 255 for both the devAddress and the tag, a slave may catch unsolicited messages form all masters. The master may specify a tag of 0 so as to communicate with devices which do not use this protocol. In this case, the above described packet is not used. The master may not specify a tag or devAddress of 255.

Address and Tag Matching Criteria

When a master begins a transmission, the address and tag are transmitted as a header to the application data. The slave receives these bytes and searches for a request which matches. As stated earlier. This match forms the conduit. The slave performs this match in the following case orders:

Case 1: A request that matches both the master's address and tag

Case 2: If that fails, a request with a tag of 255 and a match on the master's address Case 3: If that fails, a request with a an address of 255 and a match on the master's tag Case 4: If that fails, a request with both the address and tag being 255

If no match is found, the incoming message is indiscriminately discarded. After the match is found, the slave request becomes active and the address and tag bytes are discarded. These cases are illustrated in more detail in FIGS. 3D–3G.

Those skilled in the art should appreciate that cases 1–4 can occur in different orders, and that other cases can be used instead of the cases 1–4 without departing from the scope of the invention.

Conduit Interlock

When a request is completed, the conduit is interlocked while the application callback is in effect. This allows the application to make another request before a new communication begins. Without this, a master could perform two back-to-back Writes before the slave is ready for the $2^{nd}$ Write (and hence the 2nd Write would be lost). Similarly, a process that wants to use a master Write followed by a slave Read (perhaps to send a command and receive a response) could not be guaranteed to initiate the slave Read prior to receiving the response. The master implements the interlocking by withholding release of the bus during the application callback. A slave implements the interlocking by withholding the dummy read (a Not Acknowledged condition to finish slave communication). Note that withholding the dummy read does not hold the bus since the bus is already free from operation of the master. Withholding the dummy read does, however, prevent the 1st byte of an incoming message from passing into the driver, accomplishing the needed interlock.

Protocol Examples

Figure 3A:
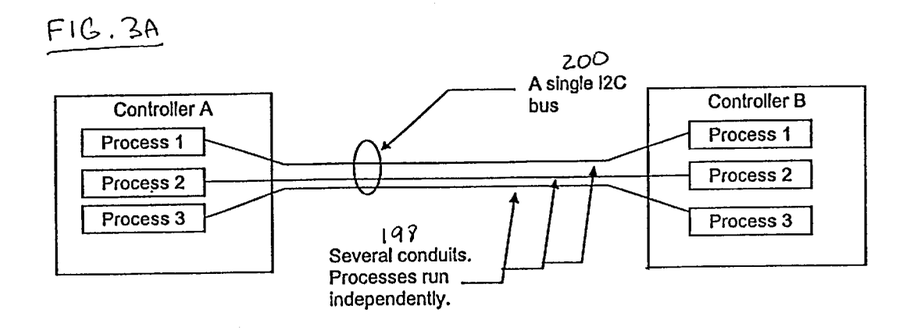
FIG. 3A illustrates multiple conduit communication between multiple processors on the I²C bus, in accord with the invention.

As illustrated in FIG. 3A, many conduits 198 exist on a single I²C bus 200, in accord with the invention, and processes between controllers (or microprocessors) A and B run independently. Specifically, each controller A and B may maintain and communicates across multiple processes as illustrated by processes 1–3.

Figure 3B:
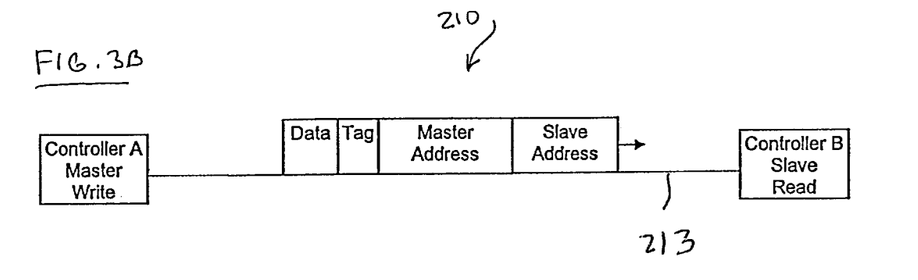
FIG. 3B illustrates an exemplary write communication between two controllers utilizing the protocol of the invention.

By way of specific example, FIG. 3B illustrates a Write operation 210 from controller A to controller B using the above-described protocol. Controller A issues a master Write ioRequest to controller B which has already issued a slave Read ioRequest. Controller A then issues a master-transmit/slave-receive to controller B. The address and tag match up at the slave and so the conduit is formed and the transfer completes. After completion, the post routine is called. When the post routine is called, the bus is kept in a busy state allowing the post routine to issue another request to supply a response.

Figure 3C:
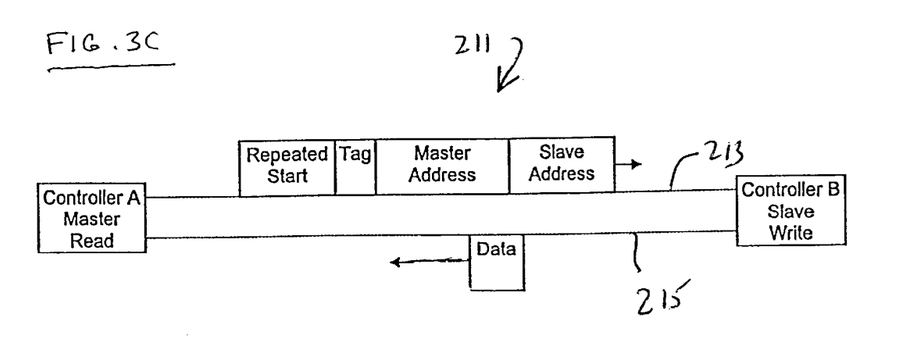
FIG. 3C illustrates an exemplary read communication between two controllers utilizing the protocol of the invention.

In a further example, FIG. 3C illustrates a Read operation 211 from controller B to controller A. Controller A issues a master Read ioRequest to controller B which has already issued a slave Write ioRequest. Controller A issues a master-transmit/slave-receive to controller B. This time, the transmission ends with a Repeated Start, which gives controller B a chance to respond. The address and tag match up at the slave and so the conduit is formed. Controller B responds with Data and the transfer completes. After completion, the post routine is called. When the post routine is called, the bus is kept in a busy state allowing the post routine to issue another request to supply a response.

Those skilled in the art should appreciate that FIGS. 3B–3C are purposefully incomplete (i.e., they do not illustrate all communications within a given operation process) for purposes of illustration. Generally, the upper communication path 213 refers to communications from left to right; and lower communication path 215 refers to communications from right to left.

Table 1 illustrates a time sequence of a bus interlock example for repeated operations, in accord with the invention.

TABLE 1

Example of bus interlock time sequence to facilitate repeated operations between controllers A and B

| Controller A: | Controller B: |
|---|---|
| | Slave reads from controller A, tag 1 |
| Master writes to controller B, tag 1 | |
| Master transmits with stop | Slave receives |
| Callback, bus is held | Callback, bus is held |
| Slave read from controller B, tag 1 | Master write to controller A, tag 1 |
| Return from callback, bus is dropped | Return from callback, dummy read |
| Slave receives | Master transmits with stop |
| Callback, bus is held | Callback, bus is held |
| Return from callback, dummy read | Return from callback, bus is dropped |

Figure 3D:
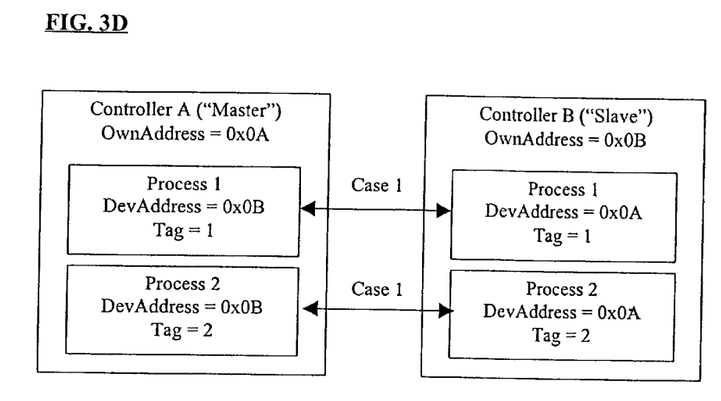
FIGS. 3D–3G illustrate exemplary inter-process communication scenarios between multiple controller processors in accord with the invention.
Figure 3E:
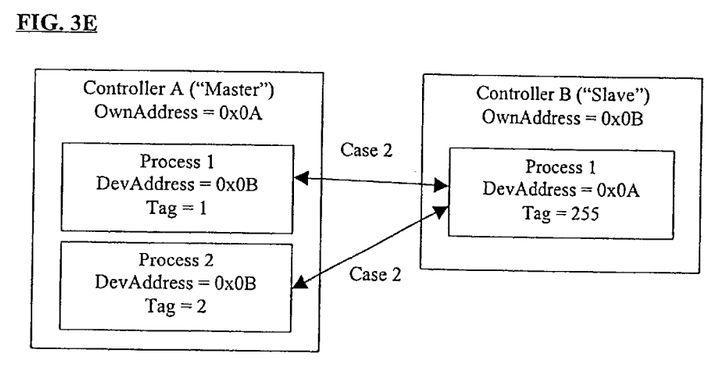
Figure 3F:
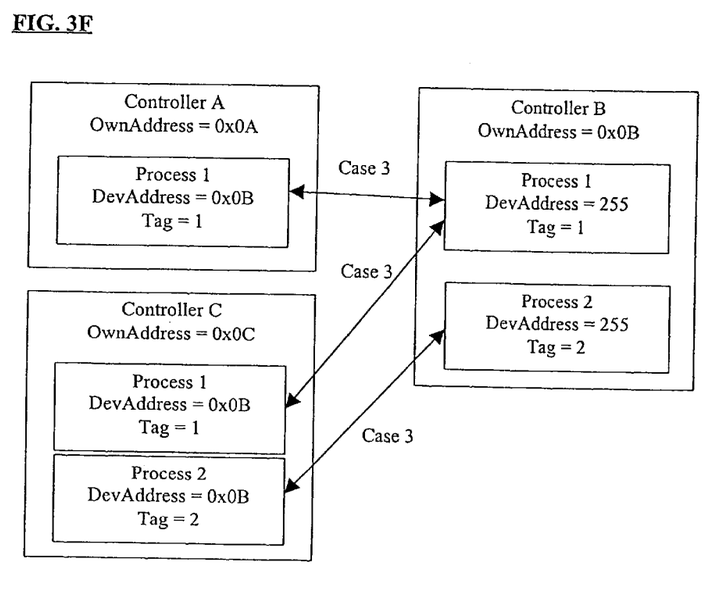
Figure 3G:
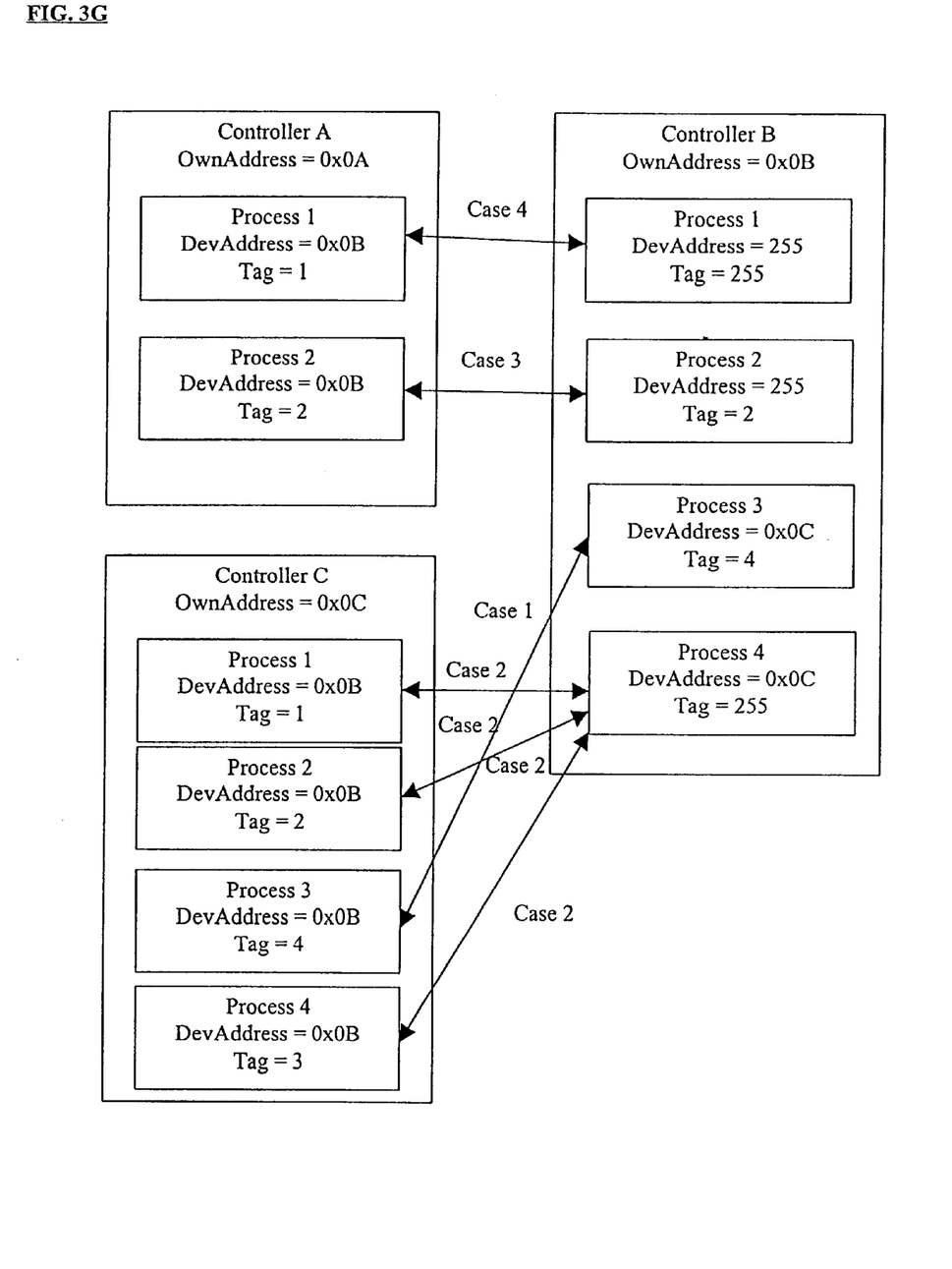

FIG. 3D illustrates communication between controller A as master and controller B as slave with one to one process correspondence, in accord with the invention. FIG. 3E illustrates communication between multiple processes of controller A as master and a single process of controller B as slave, in accord with the invention. FIG. 3F illustrates intermixed process communication between controller A as master and controller B as slave, in accord with the invention. FIG. 3G illustrates several communication scenarios between slave and master controllers, in accord with the invention. In FIGS. 3D–3G, cases 1–4 (defined above) are indicated therein to more clearly illustrate the features of the invention.

Figure 4:
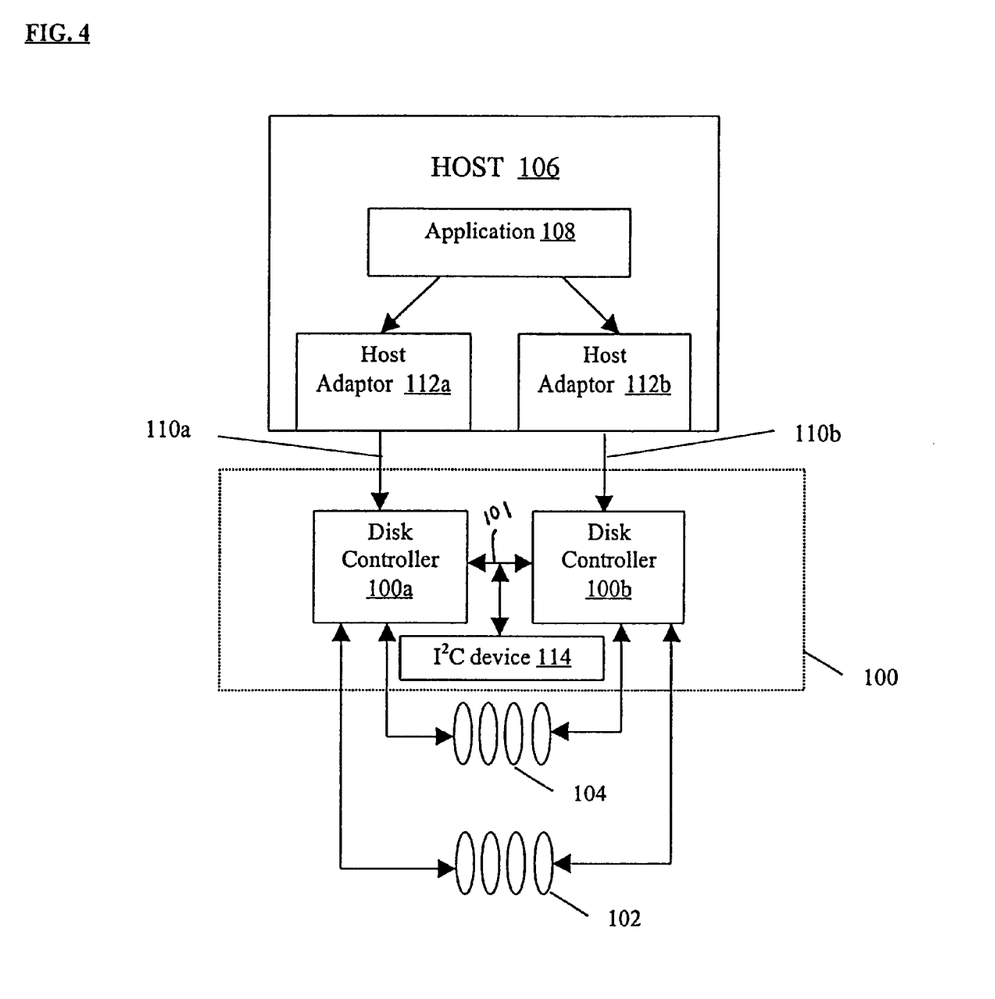
FIG. 4 depicts a raid controller constructed according to the invention and connected to a host server and disk drive array.

FIG. 4 depicts one application of the invention in a RAID (Redundant Array of Inexpensive or Independent Disks) controller 100 constructed according to the invention. RAID controller 100 connects to a collection of disk drives 102, 104 which collectively act as a single storage system and which tolerate failure of a drive without losing data. RAID controller 100 includes a pair of disk controllers 100a, 100b for redundant operation. The disk controllers 100a, 100b connect to one another via the I²C bus 101 so that each controller 100a, 100b understands the current communication process. Information such as heartbeat and data arrangement are sent along the bus 101, between controllers 100a, 100b; and a failure of one controller 100a, for example, is recovered by operation of controller 100b.

Through a pair of buses (e.g., SCSI buses) 110a, 110b, raid controller 100 connects to the host server 106 via host adapters 112a, 112b. In the host 106, an application 108 communicates (e.g., stores or receives data) with the disk drives 102, 104 as if through a single controller 100.

Communication between controllers 100a, 100b is facilitated by the I²C bus protocol system architecture described above. For example, an array of I²C devices such as device 114 can also connect to the bus 101 to provide a range of useful information such as disk drive temperature. At the same time, controllers 100a, 100b maintain communication along bus 101 for purposes of redundant operation.

For disclosure purposes, Appendix A contains I²C bus specifications as provided by Philips Semiconductor and which are hereby incorporated by reference.

The invention thus attains the objects set forth above, among those apparent from the preceding description. Since certain changes may be made in the above methods and systems without departing from the scope of the invention, it is intended that all matter contained in the above description or shown in the accompanying drawing be interpreted as illustrative and not in a limiting sense. It is also to be understood that the following claims are to cover all generic and specific features of the invention described herein, and all statements of the scope of the invention which, as a matter of language, might be said to fall there between.

Having described the invention, what is claimed is:

1. A method for communicating between first and second controllers on an I²C bus, the bus of the type which transmits data packets that start with a start condition and end with a stop condition, and that includes a destination address followed by a transmission type, a first data byte, a second data byte, and one or more additional data bytes, comprising the steps of:

designating the destination address with a unique bus address of the second controller;

designating the first data byte with a unique bus address of the first controller; and specifying the transmission type, wherein the first and second controllers initiate a master-slave relationship for read and write operations between controllers.

2. A method of claim 1, wherein the step of specifying the transmission type comprises designating a busControl that specifies whether the first controller operates as a slave or master.

3. A method of claim 2, wherein the step of designating the busControl type comprises specifying (a) a master request to initiate the master request as soon as possible or (b) a slave request to initiate the slave request when the first controller specifies matching conduit information.

4. A method of claim 1, wherein the step of specifying the transmission type comprises designating an ioRequest that specifies whether the transmission Is Read, Write, Read/Write or Write/Read.

5. A method of claim 4, wherein the stop of designating an ioRequest comprises designating a read by initiating a master-transmit, slave-receive protocol followed by a master-receive, slave-transmit protocol.

6. A method of claim 4, wherein the step of designating an ioRequest comprises designating a read/write by initiating a master-transmit, slave-receive protocol followed by a master-receive, slave-transmit protocol, followed by a master-transmit, slave-receive protocol.

7. A method of claim 1, further comprising the step of designating the second data byte with a tag specifying a process address within the second controller, the tag and address of the first controller defining a conduit between a process in the first controller and a process in the second controller.

8. A method of claim 7, further comprising the step of receiving data from the second controller, the step of receiving including transmitting a repeated start condition, slave address and transfer direction after formation of the conduit.

9. A method of claim 7, further comprising the step of designating one process in the second controller with a reserved tag identifier, to accept conduit communication without a match to an existing request.

10. A method of claim 7, further comprising the step of specifying a tag of zero, wherein the tag and unique address are not transmitted between the first and second controllers.

11. A method of claim 1, further comprising the step of designating the bus address of the second controller as a predetermined number to connect with any master without a match to an existing request.

12. A method of claim 1, further comprising the step of transmitting data from the first controller to the second controller prior to generation of the stop condition.

13. An $I^2C$ bus protocol system, comprising:

an $I^2C$ bus including means for communicating an $I^2C$ packet across the bus;

first and second controllers connected to the bus, each controller having (a) means for specifying a devAddress as a slave address in the $I^2C$ packet, (b) means for specifying ownAddress as a master address in a first data byte of the $I^2C$ packet, and (c) means for specifying a tag within a subsequent data byte of the $I^2C$ packet, wherein the first and second controllers initiate a master-slave relationship for read and write operations along a conduit between processes within the controllers.

14. A system of claim 13, further comprising one or more $I^2C$ devices connected to the bus, each controller having means for communicating with the $I^2C$ devices without interfering with communication between the controllers.

15. A system of claim 13, wherein the controllers comprise microprocessors.

\* \* \* \* \*